United States Patent
Alpert et al.

(10) Patent No.: US 12,530,087 B1
(45) Date of Patent: Jan. 20, 2026

(54) TRACKING INTERACTING HANDS USING SENSOR OF WEARABLE MULTIMEDIA DEVICE

(71) Applicant: Hewlett-Packard Development Company, L.P., Spring, TX (US)

(72) Inventors: Sylvana Alpert, Sunnyvale, CA (US); Ralph Brunner, Los Gatos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 271 days.

(21) Appl. No.: 18/357,090

(22) Filed: Jul. 21, 2023

Related U.S. Application Data

(60) Provisional application No. 63/394,590, filed on Aug. 2, 2022.

(51) Int. Cl.
| | |
|---|---|
| *G06F 3/01* | (2006.01) |
| *G01S 17/894* | (2020.01) |
| *G06V 40/20* | (2022.01) |

(52) U.S. Cl.
CPC ............ *G06F 3/017* (2013.01); *G01S 17/894* (2020.01); *G06F 3/011* (2013.01); *G06V 40/28* (2022.01)

(58) Field of Classification Search
CPC ........ G06F 3/017; G06F 3/011; G06F 17/894; G06V 40/28
USPC ........................................................ 382/103
See application file for complete search history.

(56) References Cited

U.S. PATENT DOCUMENTS

| | | | |
|---|---|---|---|
| 10,353,532 B1* | 7/2019 | Holz | G06F 3/04847 |
| 2020/0334828 A1* | 10/2020 | Öztireli | G06N 20/00 |
| 2021/0174519 A1* | 6/2021 | Bazarevsky | G06T 7/75 |
| 2023/0298283 A1* | 9/2023 | Despande | G06F 3/011 |
| | | | 345/633 |
| 2024/0331446 A1* | 10/2024 | Gao | G06V 40/11 |

OTHER PUBLICATIONS

Kanel, "Sixth Sense Technology," Thesis for the Bachelor Degree of Engineering in Information and Technology, Centria University of Applied Sciences, May 2014, 46 pages.
(Continued)

*Primary Examiner* — Gabriel I Garcia
(74) *Attorney, Agent, or Firm* — Fish & Richardson P.C.

(57) ABSTRACT

Systems, methods, devices and non-transitory, computer-readable storage mediums are disclosed for the tracking of interacting hands using a sensor of a wearable multimedia device. In an embodiment, a method comprises: obtaining, with a sensor of a wearable multimedia device, a first frame of two-dimensional (2D) image data and a second frame of three-dimensional (3D) depth data; determining multiple hand regions in the first frame of 2D image data; determining a location of each hand region in the first frame of 2D image data; detecting at least one landmark in each detected hand region; generating a confidence score for each landmark detected in each detected hand region; determining 3D world coordinates for each landmark that is visible in the first frame of the 2D image data; tracking each landmark in 3D world coordinates; and determining an interaction with the hands based on the tracking of each landmark in 3D world coordinates.

22 Claims, 4 Drawing Sheets

(56) References Cited

OTHER PUBLICATIONS

Mann et al., "Telepointer: Hands-Free Completely Self Contained Wearable Visual Augmented Reality without Headwear and without any Infrastructural Reliance", IEEE International Symposium on Wearable Computing, Oct. 2000, 177-178, 4 pages.

Mann, "Wearable Computing: a First Step Toward Personal Imaging," IEEE Computer, Feb. 1997, 30(2):25-32.

Mann, "Wearable, tetherless computer-mediated reality," Feb. 1996. In Presentation at the American Association of Artificial Intelligence, 1996 Symposium; early draft appears as MIT Media Lab Technical Report 260, Dec. 1994.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Microsoft.com [online], "Direct manipulation with hands," Sep. 2022, retrieved on Jul. 12, 2023, retrieved from URL<https://learn.microsoft.com/en-us/windows/mixed-reality/design/direct-manipulation>, 21 pages.

Microsoft.com [online], "Hand tracking—MRTK2," Aug. 2022, retrieved on Jul. 12, 2023, retrieved from URL<https://learn.microsoft.com/en-us/windows/mixed-reality/mrtk-unity/mrtk2/features/input/hand-tracking?view=mrtkunity-2021-05>, 9 pages.

Mistry et al., "WUW—wear Ur world: a wearable gestural interface", Proceedings of CHI EA '09 Extended Abstracts on Human Factors in Computing Systems, ACM New York, NY, USA, 6 pages.

Shetty et al., "Sixth Sense Technology," International Journal of Science and Research, Dec. 2014, 3(12):1068-1073.

* cited by examiner

TRACKING INTERACTING HANDS USING SENSOR OF WEARABLE MULTIMEDIA DEVICE

CROSS-REFERENCE TO RELATED APPLICATION

This application claims priority to U.S. Provisional Patent Application No. 63/394,590, filed Aug. 2, 2022, the entire contents of which are incorporated herein by reference.

TECHNICAL FIELD

This disclosure relates generally to hand tracking using a sensor of a wearable multimedia device.

BACKGROUND

A typical object detection pipeline generates candidate regions for an object of interest, referred to as "proposals." Some approaches to object detection apply a sliding window over a feature map extracted from an image and assign foreground/background scores depending on the features computed in that window. Neighborhood windows with similar scores are considered as candidate regions. Such methods can lead to hundreds of proposals. Processing these many proposals through the classification network is cumbersome.

To address this issue, some object detection pipelines filter the proposals based a criteria referred to as non-maximum suppression (NMS). NMS operates on a list of proposal bounding boxes with corresponding confidence scores and an overlap threshold. NMS selects the proposal box with the highest confidence score and compares the proposal box with all the other proposal boxes by calculating an intersection over union (IOU) of the proposal box with every other proposal box (a measure of overlap), then compares the IOU with the overlap threshold. If the IOU is greater than the overlap threshold it is excluded or "filtered out" from further processing. This process proceeds until there are no more proposal boxes to process.

To properly handle interacting hands, the object detector needs to detect multiple instances of the hands at the same time. Moreover, since interacting hands can often overlap in two-dimensional (2D) space, the object detector must correctly detect multiple instances of the interacting hands even when such instances are close together. From a computer vision perspective, this means to avoid relying on NMS methods, which cause overlapping detections to be filtered out.

SUMMARY

Systems, methods, devices and non-transitory, computer-readable storage mediums are disclosed for tracking of interacting hands using a depth sensor of a wearable multimedia device.

In an embodiment, a method comprises: obtaining, with a sensor of a wearable multimedia device, a first frame of two-dimensional (2D) image data and a second frame of three-dimensional (3D) depth data; determining, with at least one processor, multiple hand regions in the first frame of 2D image data; determining, with the at least one processor, a location of each hand region in the first frame of 2D image data; detecting, with the at least one processor, at least one landmark in each detected hand region; generating, with the at least one processor, a confidence score for each landmark detected in each detected hand region; determining, with the at least one processor, 3D world coordinates for each landmark that is visible in the first frame of the 2D image data; tracking each hand based on the 3D world coordinates of the at least one landmark; and determining, with the at least one processor, an interaction with the hands based on the tracking of each landmark in 3D world coordinates.

In an embodiment, the at least one landmark is a joint or finger tip of a finger in the detected hand region.

In an embodiment, the at least one landmark is a palm or wrist in the detected hand region.

In an embodiment, detecting at least one landmark in each detected hand region comprises using a landmark detection model that is trained to predict the 3D world coordinates of the at least one landmark.

In an embodiment, bounding boxes for the location of each hand region in the first frame of 2D image data and for the at least one landmark in each detected hand region are predicted by a machine learning model, and the bounding boxes identify locations of the hand regions and landmarks in the 2D image data.

In an embodiment, the landmark detection model uses regression to perform keypoint localization of 3D hand-knuckle coordinates inside the detected hand region, and wherein the landmark detection model is trained to learn internal hand pose representations.

In an embodiment, the landmark detection model is trained on annotated ground truth data and a synthetic hand model over various backgrounds that is mapped to corresponding 3D point coordinates.

In an embodiment, the sensor is a time of flight camera that outputs infrared or amplitude image data and the depth data that are registered by the sensor.

In an embodiment, determining 3D world coordinates in the second frame of 3D depth data for each landmark that is visible in the first frame of the 2D image data comprises adding a depth component from the depth data to the corresponding 2D pixel coordinates of each landmark.

In an embodiment, the time of flight camera is an infrared camera that is adjusted to measure a range of temperature that approximates human body temperature, and each hand region is detected by binarization on the first frame using a threshold value.

In an embodiment, detecting each hand region in the first frame of 2D image data, comprises: downsampling, with the at least one processor, the 3D depth data; dividing the downsampled 3D depth data into clusters; deleting clusters with less than a threshold number of 3D data points, such that any remaining clusters are presumed to be hand clusters; identifying for each hand cluster if the cluster captured a left or right hand; identifying and removing arm points from the hand clusters; and determining a dominant axis of each hand cluster to determine a hand direction.

In an embodiment, each hand region is detected using template matching.

In an embodiment, the landmark is determined to be visible based at least in part on the confidence score for the landmark.

In an embodiment, a system comprises: at least one processor; and memory storing instructions that, when executed by the at least one processor, cause the at least one processor to perform any of the methods described above.

In an embodiment, a non-transitory computer-readable storge medium configured to store instructions that, when executed by the at least one processor, cause the at least one processor to perform any of the methods described above.

The implementations described herein can provide various technical benefits. For example, the disclosed embodiments can detect multiple instances of hands at the same time and correctly detect multiple instances of the hands when such instances are close together.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
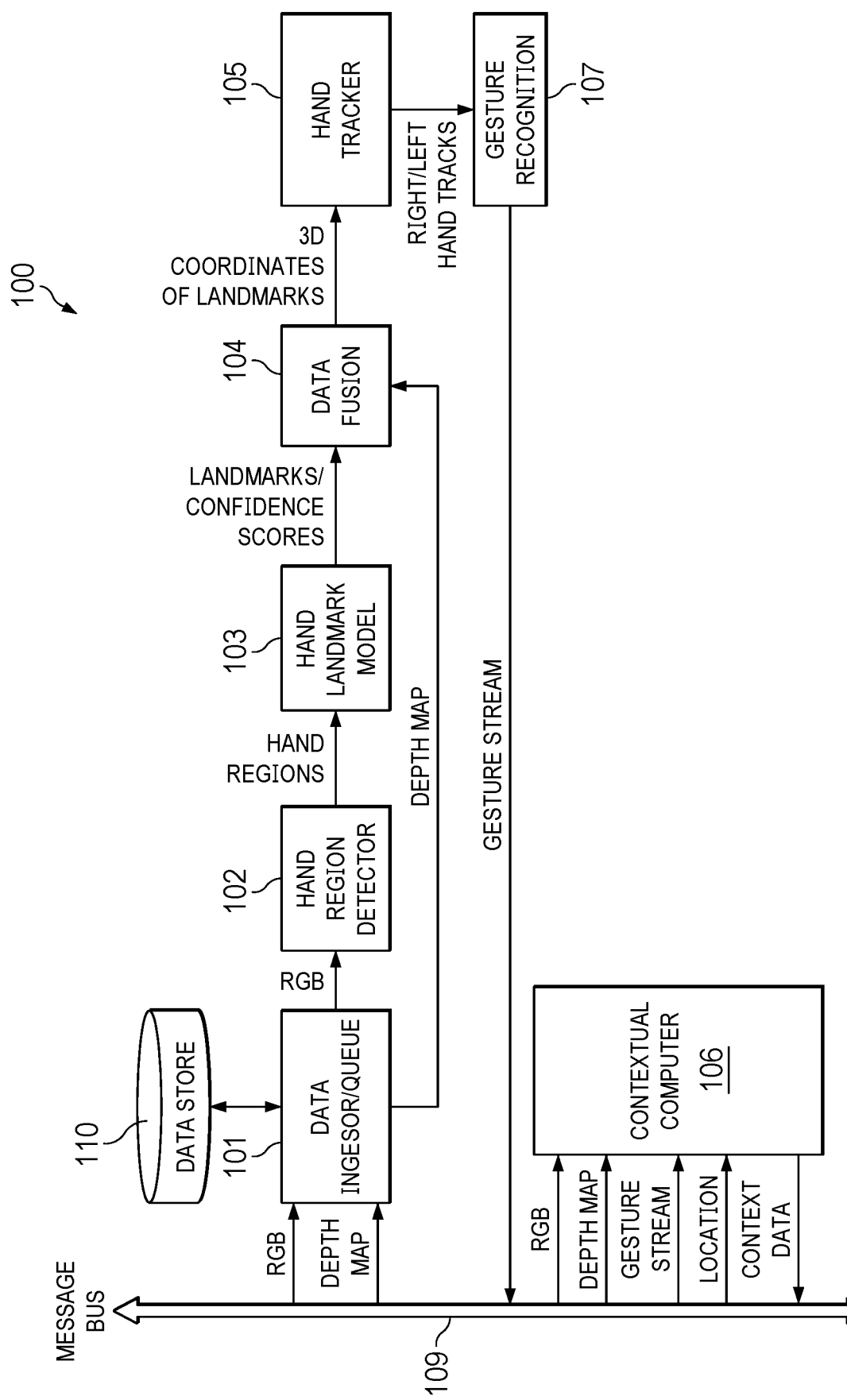
FIG. 1 is a block diagram of a system for tracking interactive hands, according to an embodiment.

The features and processes described herein can be implemented on a wearable multimedia device and/or cloud computing platform. In an embodiment, an exemplary wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including Wi-Fi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector) or other digital projection technology (e.g., Liquid Crystal on Silicon (LCOS or LCOS), Digital Light Processing (DLP) or Liquid Chrystal Display (LCD) technology), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 6.

In an embodiment, the cloud computing platform provides graphical user interfaces on a website or portal that allow various third party application developers to upload, update and manage their applications in an application ecosystem.

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the wearable multimedia device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) in between. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of a system 100 for tracking interactive hands, according to an embodiment. System 100 includes data ingestor 101, hand region detector 102, hand landmark model 103, data fuser 104, hand tracker 105, contextual computer 106 and gesture recognizer 107. System 100 can be implemented on the wearable multimedia device described herein. Various sensors of the wearable multimedia device can place raw or processed sensor data on message bus 109. Example sensors include an image sensor (e.g., an RGB camera) and a depth sensor. The depth sensor can be a TOF camera, a light detection and ranging (LiDAR) sensor or any other sensor capable of capturing 3D data (e.g., stereoscopic camera). The image sensor captures two-dimensional (2D) image data (e.g., gray scale image data, Red Green Blue (RGB) image data) and publishes the intensity image data on message bus 109 of a streaming network. Likewise, the depth sensor captures a three-dimensional (3D) depth image and publishes the 3D depth image on message bus 109. In an embodiment, a single TOF camera is used that captures intensity/amplitude (e.g., a gray-scale image of the entire scene) and depth images (e.g., a depth map) that are registered, thus avoiding alignment issues typically seen in, for example, RGB-D cameras.

Data ingestor 101 subscribes to the 2D/3D image data and stores the image data in datastore 110 and/or feeds the 2D image data directly into hand region detector 102 and the 3D image data into data fusor 104.

Figure 2:
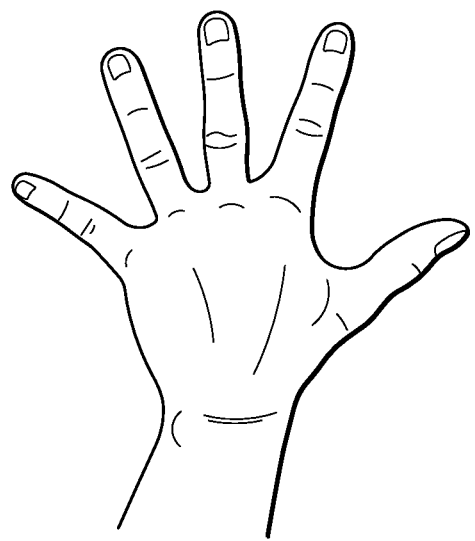
FIGS. 2-4 illustrate determining hand regions and landmarks in the hand regions, according to an embodiment.
Figure 3:
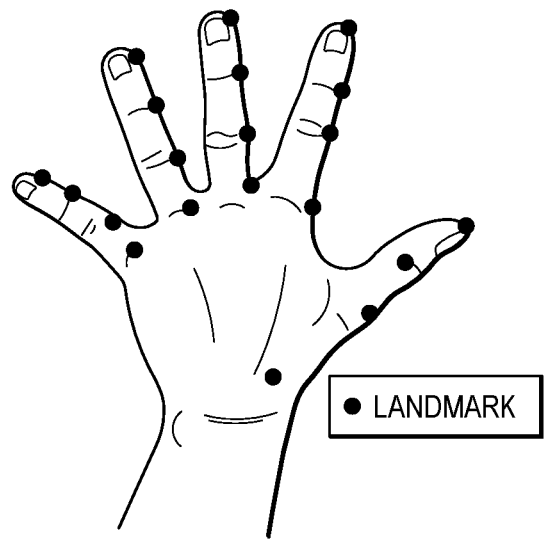
Figure 4:
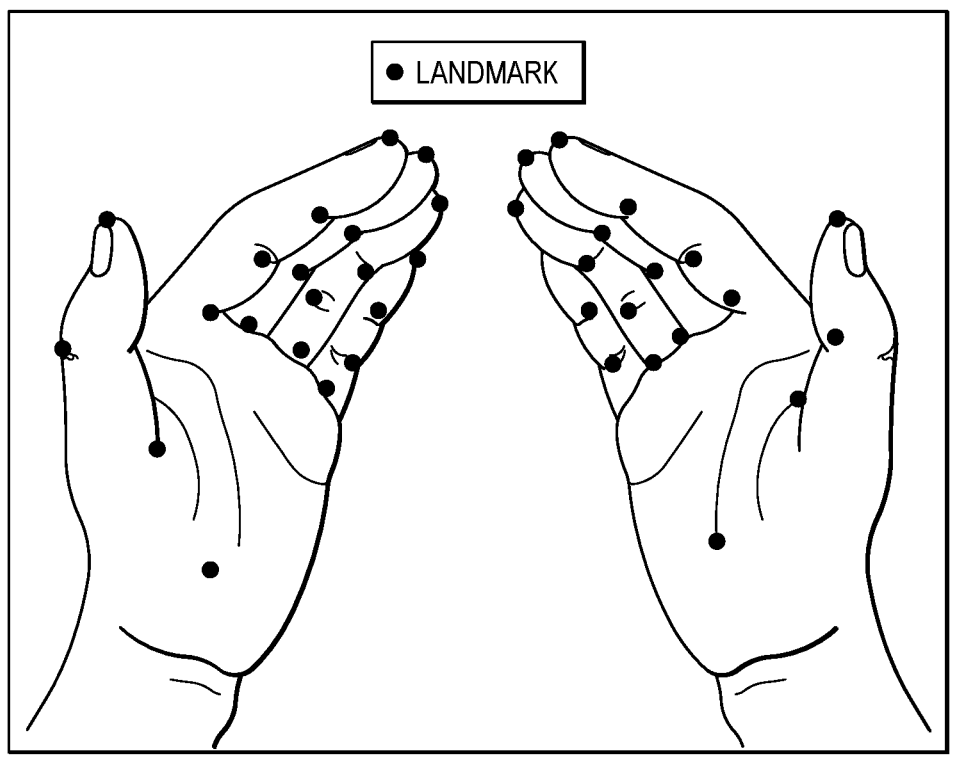

Hand region detector 102 is configured to detect hand regions in the 2D image data. FIG. 2 is an example hand region. In an embodiment, hand region detector 102 includes a machine learning (ML) model (e.g., a neural network) that is trained to predict hand regions based on actual images of human hand poses and/or synthetic hand poses from different visual perspectives and lighting conditions. The detected hand regions are input in hand landmark model 103, which is configured to determine landmarks in the hand regions. In an embodiment, hand landmark model 103 outputs landmark locations and a confidence score for each landmark. Confidence scores can be formulated as probabilities. Some example hand landmarks include but are not limited to the wrist, palm, finger joints and fingertips. Example landmarks for the hand region shown in FIG. 2 are shown in FIG. 3, where each landmark is shown as a black dot. Example landmarks for left and right hand regions are shown in FIG. 4.

In an embodiment, hand region detector 102 and landmark model 103 are integrated into a single sensor module that uses infrared (IR) 2D image data as an input and detects bounding boxes for hand regions and 2D hand landmarks. Any suitable model that does not rely on NMS can be used for the prediction of the bounding boxes, such as the CenterNet deep detection architecture, described in Kaiwen Duan et al., CenterNet: Keypoint Triplets for Object Detection arXiv: 1904.08189v3 [cs.CV] 19 Apr. 2019.

The landmark model predictions are then combined by data fuser 104 to map each coordinate of interest in 2D space to its corresponding 3D position coordinate in a world coordinate system using camera intrinsic parameters, the 2D position coordinates (e.g., x-axis and y-axis coordinates) determined from the 2D image data and a depth coordinate (e.g., a z-axis coordinate) measured at the 2D position coordinate in the 3D depth data. In this embodiment, a depth map is used to add the depth component (z component) for each landmark. The 2D pixel coordinates with the added depth/z component are then transformed from 2D pixel coordinates to 3D world coordinates. This embodiment allows specific parts of the hand in space (e.g., the palm) and track its distance to a fingertip that, e.g., interacts with a user interface element (e.g., a virtual keyboard, icon, etc.) projected on a surface (e.g., a laser projection).

In an embodiment, a point cloud is detected within the 2D bounding boxes containing the left and right hand regions and processed with one or more clustering algorithms (e.g., DBSCAN) in 3D space to select the largest cluster and discard outliers, thus allowing detection of distinct hand point clouds. In scenarios involving interacting hands, landmarks may become occluded, resulting in a misreading of the depth axis or z-axis coordinate, which then translates into an incorrect 3D world coordinate position estimate. The process described above address the occlusion problem by not generating a full hand pose estimate in 3D space, but rather generating a narrower and lightweight description of the scene to enable certain hand interactions, such as touch interactions with a virtual display.

In an embodiment, detecting hand regions in 2D image data, comprises: downsampling, with the at least one processor, the 3D depth data; dividing the downsampled 3D depth data into clusters; deleting clusters with less than a threshold number of 3D data points, such that any remaining clusters are presumed to be hand clusters; identifying for each hand cluster if the cluster captured a left or right hand; identifying and removing arm points from the hand clusters; and determining a dominant axis of each hand cluster to determine a hand direction. In other embodiments, hand regions are detected using template matching. In an embodiment, a landmark is determined to be visible based at least in part on the confidence score for the landmark. For example, if a confidence score is a percentage probability greater than x % (e.g., 90%) the landmark is considered to be visible in the image frame.

Hand tracker 105 outputs tracks for the hands (e.g., right and left hand tracks). The hand tracks are input into gesture recognizer 107, which detects a hand or finger gesture and places gesture recognition data (e.g., a gesture descriptor) onto message bus 109 so that other applications running on the wearable multimedia device can use the gesture recognition data to perform various tasks. Example gestures include but are not limited to: pointing, tapping, pinching, de-pinching, swiping, waving, handshaking, and any other gesture made by a left or right hand by itself any interaction between a user's the left and right hand (e.g., clapping, finger interlocking) or between one of the user's hands and another person's hand (e.g., handshaking, "high five") or holding or manipulating an object in one or both hands or fingers. An example gesture recognition algorithm is the gesture recognition algorithm included in the MediaPipe framework.

Figure 5:
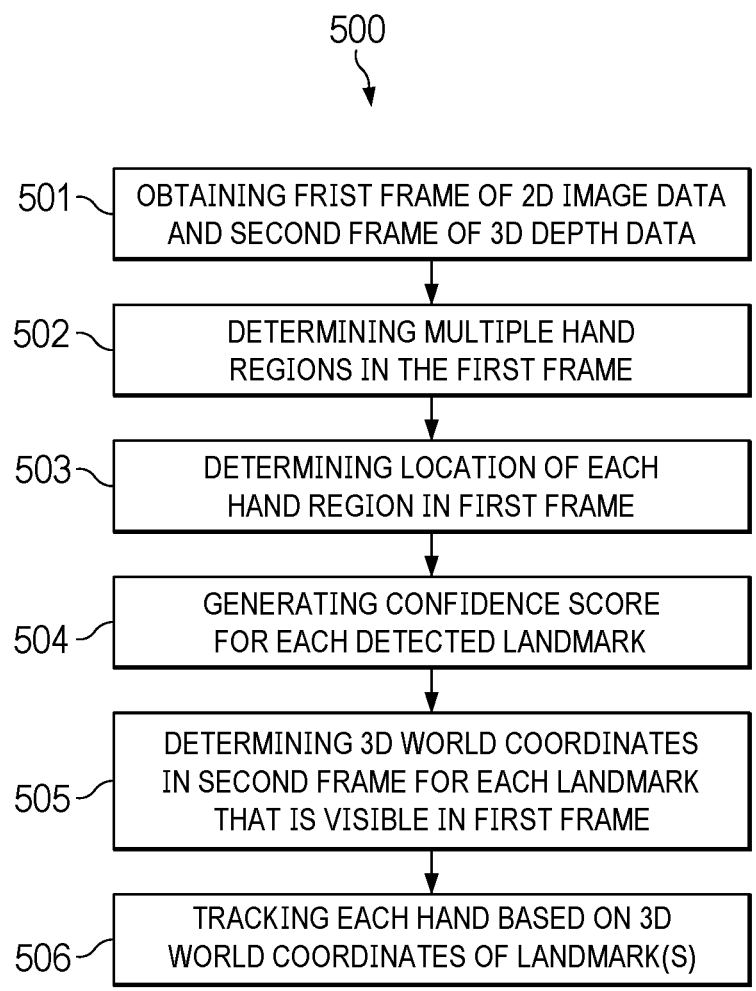
FIG. 5 is a flow diagram of a process of tracking interactive hands, according to an embodiment.

FIG. 5 is a flow diagram of a process 500 of tracking interactive hands, according to an embodiment. Process 500 can be implemented using, for example, system 100 implemented on the hardware/software architecture shown in FIG. 6.

Process 500 includes the steps of obtaining a first frame of 2D image data (e.g., an RGB camera image) and a second frame of 3D depth data (e.g., a depth map) 501, determining multiple hand regions in the first frame 502 (e.g., left and right hands of a user), determining a location of each hand region in the first frame (503) (e.g., x, y coordinates defining a hand region in a 2D camera image), determining landmarks that are visible in each hand regions and a confidence score for each landmark (504), determining 3D point coordinates for each landmark that is visible in the first frame (504) and tracking each hand based on changes in 3D point coordinates of the landmarks (505). Each of these steps is described in detail in reference to FIG. 1. In an embodiment, the image data (e.g., RGB image) and depth data (e.g., a depth map) are obtained by a TOF camera, such that the frames of RGB data and depth map are registered, thus eliminating issues with misalignment.

Example Wearable Multimedia Device Architecture

Figure 6:
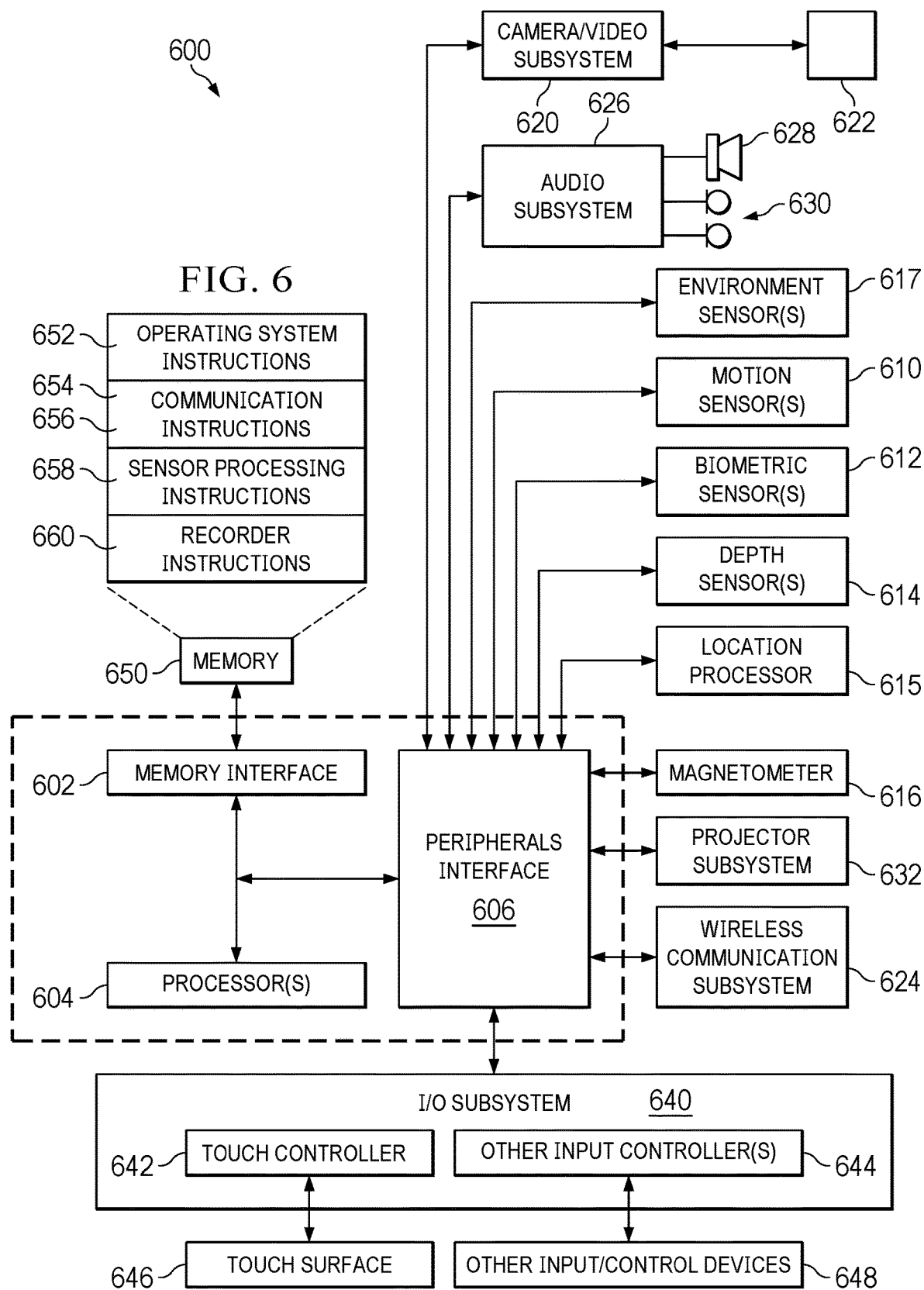
FIG. 6 is a block diagram of example architecture for a wearable multimedia device implementing the features and processes described in reference to FIGS. 1-5.

FIG. 6 is a block diagram of example architecture 600 for a wearable multimedia device implementing the features and processes described in reference to FIGS. 1-5. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functions. For example, motion sensor(s) 610, biometric sensor(s) 612, and depth sensor(s) 614 may be coupled to peripherals interface 606 to facilitate motion, orientation, biometric, and depth detection functions. In some implementations, motion sensor(s) 610 (e.g., an accelerometer, rate gyroscope) may be utilized to detect movement and orientation of the wearable multimedia device.

Other sensors may also be connected to peripherals interface 606, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 615 (e.g., GNSS receiver chip) may be connected to peripherals interface 606 to provide georeferencing. Electronic magnetometer 616 (e.g., an integrated circuit chip) may also be connected to peripherals interface 606 to provide data that may be used to determine the direction of magnetic North. Thus, electronic magnetometer 616 may be used by an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMAX, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, telephony functions and beamforming.

I/O subsystem 640 may include touch controller 642 and/or another input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one implementation, touch surface 646 may display virtual or soft buttons, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

Further, a projector subsystem 632 may be connected to peripherals interface 606 to present information visually to a user in the form of projected light. For example, the projector subsystem 632 can project light onto a surface according to a particular spatial and/or temporal pattern, such that the user perceives text, images, videos, colors, patterns, and/or any other graphical information on the surface. In some implementations, the projector subsystem 632 can project light onto a surface of the user's body, such as the user's hand or palm. In some implementations, the projector subsystem 632 can project light onto a surface other than the user's body, such as a wall, a table, a desk, or any other object.

In some implementations, the projector subsystem 632 project light onto a surface to provide an interactive virtual interface (VI) for a user. For example, the projector subsystem 632 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 620, environment sensor(s) 617, depth sensor(s) 614, etc.), identify one or more commands associated with those gestures, and execute the identified commands (e.g., using the processor(s) 604).

In some implementations, device 600 plays back to a user recorded audio and/or video files (including spatial audio), such as MP3, AAC, spatial audio and MPEG video files. In some implementations, device 600 may include the functionality of an MP3 player and may include a pin connector or other port for tethering to other devices. Other input/output and control devices may be used. In an embodiment, device 600 may include an audio processing unit for streaming audio to an accessory device over a direct or indirect communication link.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, IOS, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peerto-peer communications with wireless accessory devices, as described in reference to FIGS. 1-5. Communication instructions 654 may also be used to select an operational mode or communication medium for use by the device, based on a geographic location of the device.

Memory 650 may include sensor processing instructions 658 to facilitate sensor-related processing and functions and recorder instructions 660 to facilitate recording functions, as described in reference to FIGS. 1-5. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    obtaining, with a sensor of a wearable multimedia device, a first frame of two-dimensional (2D) image data and a second frame of three-dimensional (3D) depth data;
    determining, with at least one processor, multiple hand regions in the first frame of 2D image data;
    determining, with the at least one processor, a location of each hand region in the first frame of 2D image data;
    detecting, with the at least one processor, at least one landmark in each detected hand region;
    generating, with the at least one processor, a confidence score for each landmark detected in each detected hand region;
    determining, with the at least one processor, 3D world coordinates for each landmark that is visible in the first frame of the 2D image data;
    tracking, with the at least one processor, each landmark in 3D world coordinates; and
    determining, with the at least one processor, an interaction with the hands based on the tracking of each landmark in 3D world coordinates.

2. The method of claim 1, wherein the at least one landmark is a joint or finger tip of a finger in the detected hand region.

3. The method of claim 1, wherein the at least one landmark is a palm or wrist in the detected hand region.

4. The method of claim 1, wherein detecting at least one landmark in each detected hand region comprises using a landmark detection model that is trained to predict the 2D or 3D point coordinates of the at least one landmark.

5. The method of claim 1, wherein bounding boxes for the location of each hand region in the first frame of 2D image data and for the at least one landmark in each detected hand region are predicted by a machine learning model, and the bounding boxes identify locations of the hand regions and landmarks in the 2D image data.

6. The method of claim 5, wherein the landmark detection model is trained on annotated ground truth data and a synthetic hand model over various backgrounds that is mapped to corresponding 2D or 3D point coordinates.

7. The method of claim 1, wherein the sensor is a time of flight camera that outputs infrared or amplitude image data and the depth data that are registered to each other by the sensor.

8. The method of claim 7, wherein determining 3D world coordinates in the second frame of 3D depth data for each landmark that is visible in the first frame of the 2D image data comprises adding a depth component from the depth data to the corresponding 2D pixel coordinates of each landmark.

9. The method of claim 7, wherein the time of flight camera is an infrared camera that is adjusted to measure a range of temperature that approximates human body temperature, and each hand region is detected by binarization on the first frame using a threshold value.

10. The method of claim 1, wherein each hand region is detected using template matching.

11. The method of claim 1, wherein the landmark is determined to be visible based at least in part on the confidence score for the landmark.

12. A system comprising:
a sensor;
at least one processor; and
memory storing instructions that, when executed by the at least one processor, cause the at least one processor to perform operations comprising:
obtaining, with the sensor, a first frame of two-dimensional (2D) image data and a second frame of three-dimensional (3D) depth data;
determining multiple hand regions in the first frame of 2D image data;
determining a location of each hand region in the first frame of 2D image data;
detecting at least one landmark in each detected hand region;
generating a confidence score for each landmark detected in each detected hand region;
determining 3D world coordinates for each landmark that is visible in the first frame of the 2D image data;
tracking each hand in 3D world coordinates; and
determining an interaction with the hands based on the tracking of each landmark in 3D world coordinates.

13. The system of claim 12, wherein the at least one landmark is a joint or finger tip of a finger in the detected hand region.

14. The system of claim 12, wherein the at least one landmark is a palm in the detected hand region.

15. The system of claim 12, wherein detecting at least one landmark in each detected hand region comprises using a landmark detection model that is trained to predict the 2D or 3D world coordinates of the at least one landmark.

16. The system of claim 12, wherein bounding boxes for the location of each hand region in the first frame of 2D image data and for the at least one landmark in each detected hand region are predicted by a machine learning model, and the bounding boxes identify locations of the hand regions and landmarks in the 2D image data.

17. The system of claim 16, wherein the landmark detection model is trained on annotated ground truth data and a synthetic hand model over various backgrounds that is mapped to corresponding 3D world coordinates.

18. The system of claim 17, wherein determining 3D world coordinates in the second frame of 3D depth data for each landmark that is visible in the first frame of the 2D image data comprises adding a depth component from the depth data to the corresponding 2D pixel coordinates of each landmark.

19. The system of claim 12, wherein the sensor is a time of flight camera that outputs infrared or amplitude image data and the depth data that are registered by the sensor.

20. The system of claim 19, wherein the time of flight camera is an infrared camera that is adjusted to measure a range of temperature that approximates human body temperature, and each hand region is detected by binarization on the first frame using a threshold value.

21. The system of claim 12, wherein each hand region is detected using template matching.

22. The system of claim 12, wherein the landmark is determined to be visible based at least in part on the confidence score for the landmark.

* * * * *